C. C. GOSSAGE.
BOLT FASTENING FOR THE LIDS OF BOXES, CASES, AND OTHER RECEPTACLES HAVING LIDS.
APPLICATION FILED AUG. 22, 1916.
1,346,450.
Patented July 13, 1920.
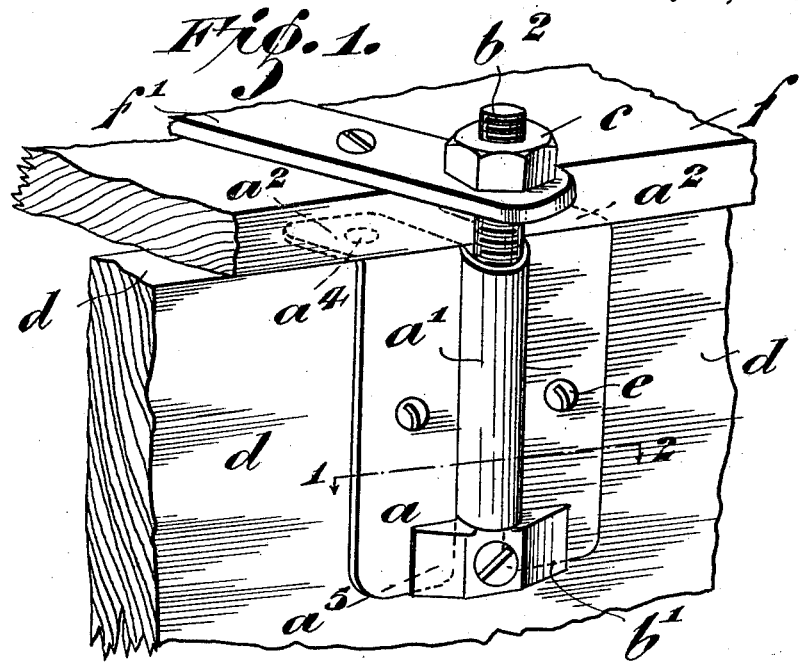
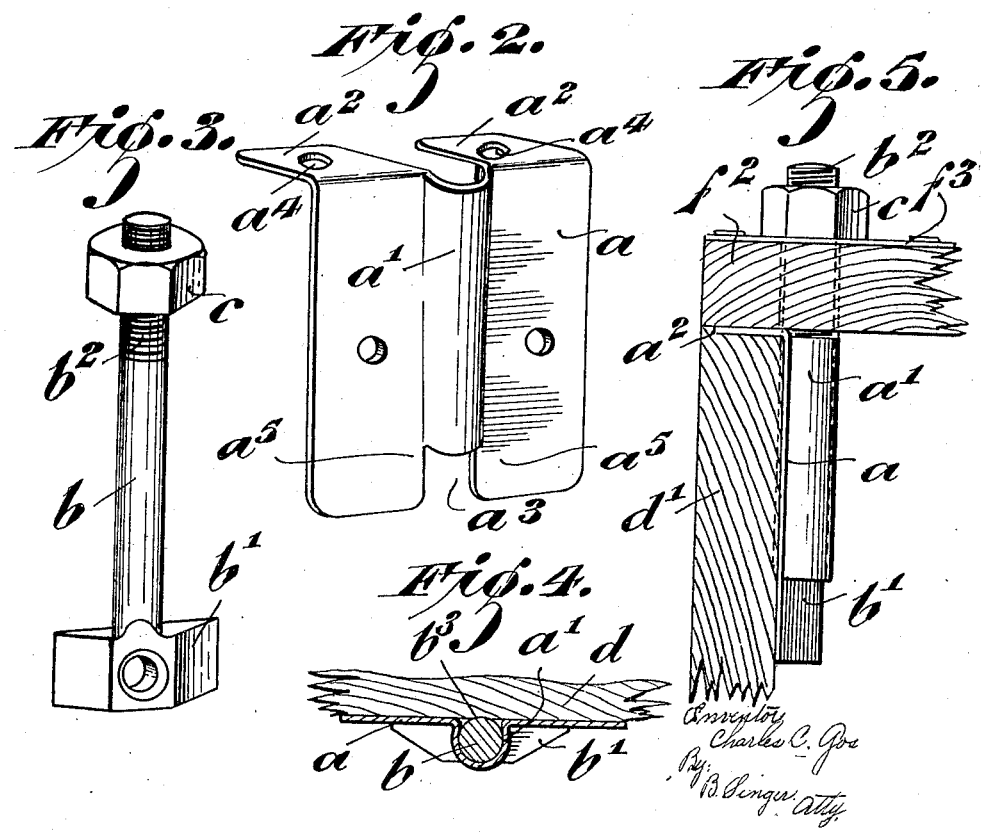

UNITED STATES PATENT OFFICE.

CHARLES CLIFFORD GOSSAGE, OF BIRMINGHAM, ENGLAND.

BOLT-FASTENING FOR THE LIDS OF BOXES, CASES, AND OTHER RECEPTACLES HAVING LIDS.

1,346,450.     Specification of Letters Patent.     Patented July 13, 1920.

Application filed August 22, 1916. Serial No. 116,382.

*To all whom it may concern:*

Be it known that I, CHARLES CLIFFORD GOSSAGE, a subject of the Kingdom of Great Britain, residing at 41 George road, Edgbaston, Birmingham, in the county of Warwick, England, engineer manager, have invented certain new and useful Improvements Relating to Bolt-Fastenings for the Lids of Boxes, Cases, and other Receptacles Having Lids, of which the following is a specification.

This invention relates to bolt-fastenings for use in securing the lids or opening parts of any class of box or utensil, and comprises in the one part a plate formed of stamped or cast metal which is provided with horizontal extensions forming right angle flanges and a longitudinal socket or recess, and in the other part of a screw bolt having wing projections at its head, the bolt part of which fits in the socket of the plate, and is provided at the screw end with a suitable screw nut, the plate and head of the bolt being secured to the vertical face of the box with the right angle flanges of the plate between the top edge of the box and the underside of the lid by means of which flanges the plate is prevented by the pressure of the lid from rising and being wrenched from the box when the nut is being screwed down for securing the lid in position, the wing head of the bolt being so arranged that when secured to the side of the box, the metal plate is thereby clamped to the side of the box by which means the possibility of the fastener being torn or forced away from the side of the utensil by any lateral pressure or strain is materially reduced.

In order that this invention may be clearly understood and readily carried into practice, reference may be had to the appended explanatory sheet of drawings, upon which:—

Figure 1 shows a view of a portion of the side and lid of a box with the improved fastener shown in position.

Fig. 2 is a view of the plate when detached.

Fig. 3 is a view of the wing ended bolt when separate from the plate.

Fig. 4 is a cross section through the plate and bolt taken on the line 1—2.

Fig. 5 is a vertical section through one side of a box and its lid illustrating a modification in the method of fixing the fastening.

In an embodiment of this invention the plate $a$ may be of sheet metal stamped or a malleable casting is formed with a socket or recessed part $a^1$ and has extensions forming the right angle flanges $a^2$, the bolt $b$ being provided with a wing shaped head $b^1$ and screw thread $b^2$ for receiving the screw nut $c$, the socket $a^1$ of the plate $a$ being stopped off at $a^3$ so as to allow the wings $b^1$ of the head of the bolt to overlap the extensions $a^5$ of the plate $a$.

The head $b^1$ of the bolt may be varied in shape so long as it allows of engaging with the plate or socket and being substantially fixed to the box.

For fixing the fastening in position the bolt $b$ is inserted in the socket $a^1$ of the plate which plate is then secured to the side $d$ of the box by suitable screws, nails, bolts or rivets $e$, the wing head $b^1$ of the bolt being also secured by a substantial screw, nail, bolt or rivet in such a manner as to clamp the sides of the plate tightly against the face of the box, the horizontal flanges $a^2$ of the plate which fit in a recess formed in the top edge of the box side being secured by suitable screws, nails or rivets through the holes $a^4$. The bolt $b$ is preferably slightly larger in diameter than the depth of the socket or recess $a^1$ so that the exposed side of the bolt projects slightly beyond the face of the plate $a$ as illustrated at $b^3$ Fig. 4 so that when the plate is clamped to the box the bolt is pressed into the side of the box along its whole length, thus assisting in the rigidity of the fixing. The lid $f$ of the box in this case having cross braces $f^1$ secured thereto is fixed by being placed in position with the end of the bolt $b$ passing through a hole in the cross brace $f^1$ the lid being secured by the screwing on to the bolt of the screw nut $c$, by which means the lid is securely held in position and the flanges $a^2$ of the plate securely retained down by the underside of the lid thereby preventing the possibility of the plate $a$ and bolt $b$ being wrenched upward from its fastening by the screw action of the nut $c$.

In the case of the cross brace $f^1$ being of wood, a suitable washer or plate may be secured on the top of the cross brace to prevent the nut cutting into the surface, or in cases where cross braces such as shown are not used the fastening may be fixed within the box or utensil as illustrated by Fig. 5, in which case the lid $f^2$ is provided with a hole which the end of the bolt $b$ passes through, the lid being then secured to the box $d^1$ by the nut $c$ as before described, a suitable washer or plate $f^3$ being fixed on the top of the lid to distribute the pressure of the nut $c$.

Fastenings as hereinbefore described are applicable for securing the lids or coverings of various kinds of cases, boxes or utensils whether of metal or wood.

What I claim as my invention and desire to secure by Letters Patent is:—

A fastener comprising a plate for attachment to a wall of a box or the like, said plate having a semi-tubular portion forming a socket and also having a flange at one end to fit over the edge of said wall and bear under a lid, a bolt in said socket and having a T-head bearing against one end of the socket and also bearing on said plate to prevent the bolt from turning, said T-head having an opening, fastening means extending through said opening and into said box wall and independently securing the bolt in place, the opposite end of said bolt projecting beyond the plate and adapted to extend through an opening in the box lid, and a nut screwed on said end of the bolt to bear on and secure the lid.

In witness whereof I have hereunto set my hand.

CHARLES CLIFFORD GOSSAGE.